UNITED STATES PATENT OFFICE.

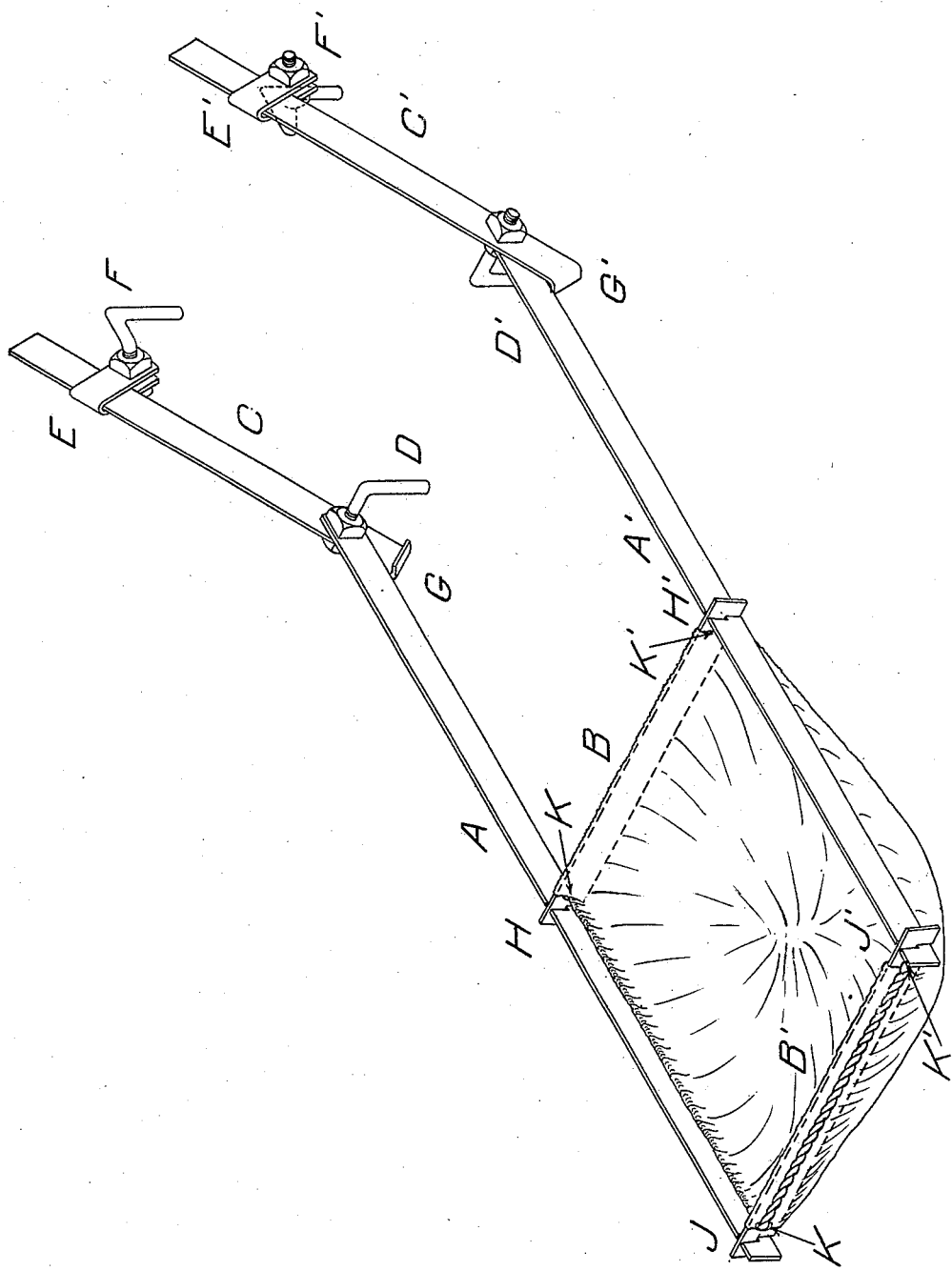

WILLIAM HENRY GRANBERY, OF NEW YORK, N. Y., AND JULIAN HASTINGS GRANBERY, OF EAST ORANGE, NEW JERSEY.

FEEDING HARNESSED DRAFT-ANIMALS.

No. 931,596.  Specification of Letters Patent.  Patented Aug. 17, 1909.

Application filed January 5, 1909. Serial No. 470,873.

*To all whom it may concern:*

Be it known that we, WILLIAM HENRY GRANBERY and JULIAN HASTINGS GRANBERY, citizens of the United States, residing, respectively, at 10 West Seventy-first street, in the city and county of New York and State of New York, and at 75 Hollywood avenue, in the city of East Orange, county of Essex, and State of New Jersey, have invented a new and useful Device for Feeding Harnessed Draft-Animals, of which the following is a specification.

Our invention relates to the provision of advantageous supports for the feeding bag or feed receptacle for harnessed draft animals and an improved form of such feeding bag or receptacle.

Among the objects of the invention are, in a feed device supported from the harness of the animal, to render the whole cheap of construction, strong, compact, and portable, and of few parts, to enable the device to be readily supported on and removed from the harness, to render it stable when so supported, to permit of adjustment of the supporting parts, to varying harnesses and to different animals, without necessitating alteration of the relation between the receptacle and the mouth of the animal, to provide an improved feed bag or receptacle removable from the supports and when removed serviceable for containing or transporting feed, etc., and to enable the device to be readily taken apart for compactness or transportation, renewal of parts, and cleansing.

Other objects and advantages of the invention will become apparent as the specification proceeds.

We attain these objects by the use of a feed bag or receptacle, made of canvas or other suitable material, and the supports therefor made of metal, wood or other suitable material, as shown in the accompanying drawing—in which the device is shown in perspective; all of its parts assembled and ready for attachment to the collar of the harnessed draft animal, or other available portion of its harness. For the sake of clearness in the drawing, neither the animal nor its harness is presented.

The device is symmetrical about a central line and consists of a pair of primary arms A, A', which occupy an approximately horizontal position when the device is attached to the harnessed animal, in manner as hereinafter described; and which support the feeding bag or receptacle at their outer ends by aid of the cross bars B, B', when the device is assembled as a unit.

The primary arms A, A', are foldably attached, at their ends opposite to the feed bag or receptacle, to a pair of secondary arms C, C', by the pivots D, D'. The prolongations of the pivots D, D', are so adapted as to be readily hooked, or otherwise attached, to the trace iron of the harness, or to the connection provided on the harness for the trace connection; and thus provide support for the primary arms A, A'. The same function may be performed by prolonging the arms A, A', or C, C', beyond the pivots D, D', and shaping such prolongations in such manner that they may be readily attachable to the trace iron, or other connection for the traces upon the harness, and in such manner provide support for the arms A, A'.

Adjustable supports are provided upon the secondary arms C, C', in such manner that they may either freely slide upon said arms, or may be fixedly clamped thereto at any point, by means of the clamps E, E' and the hook-bolt-ends F, F'; the hooks formed by the bolt-ends are adapted to removably attach the arms C, C', at their outer ends, to the rein-rings or other similar fixture, upon the harness; to thus afford support for said arms, and in connection with the supports provided for the arms A, A', as hereinbefore described, afford a second and sustaining point of support for the entire device; in this manner securing for the device stability of position when adjusted for feeding purposes. The same function may be performed, without the use of the adjustable clamps E, E' and the hook-bolt-ends F, F', by bending or shaping the ends of the arms C, C', at their proper points as determined by the dimensions of the harness, so as to form readily attachable connections with the rein-rings or other similar fixtures on the harness.

Stops G, G' are provided on the connecting ends of the arms C, C', for the purpose of limiting the angles which may be formed between the primary arms A, A' and the secondary arms C, C' when the device is attached to the harness of an animal, in manner hereinbefore described. These stops are formed by bending the lower ends of the arms C, C', at approximately right angles thereto, in such manner that when the device is attached to the harness, in manner hereinbefore described, the arm A, A' will rest upon and be supported by the stops G, G', and will occupy an approximately horizontal position.

It is evident that slight difference in the angles at which the ends of the arms C, C' shall be bent, to form the stops G, G', or slight differences in the distance of the stops from the pivots, will allow proportional differences in the angles which may be formed between the primary arms A, A' and the secondary arms C, C'. It is also evident that the device, as shown and specified, permits the arms C and C' to be folded alongside of and parallel to the arms A and A' respectively, when not attached to the harness in manner herein specified.

The feed bag or receptacle is, either permanently or removably, attached to the cross bars B, B' which, when in place as shown in the accompanying drawing, support the receptacle in such manner and position as to afford the harnessed animal free opportunity for feeding and breathing.

At the proper points of intersection of the arms A, A' and the cross bars B, B', when the device is assembled as a unit, the cross bars B, B' are notched on their under sides, as at H, H' and J, J'; the arms A, A' are correspondingly notched on their upper sides as indicated. By this means the cross bars B, B' may be readily attached to, or detached from, the arms A, A'; hold the entire device in proper form and position when it is assembled as a unit; serve to brace and strengthen the arms A, A', and thus preserve the correct opening or space for the feed bag or receptacle.

Near the notches H, H' and J, J' and also inside of the intersection of the cross bars B, B' with the arms A, A', when the device is assembled as a unit, holes K, K', are provided on each of the cross bars B and B', through which a cord or draw string is passed, having a secure fastening at its originating end; passing thence through a hemmed fold, or other holding fastening of the feed bag or receptacle, to and through a corresponding hole in the cross bar opposite, thence along said cross bar, and on its outer side, to and through a similar hole at its opposite end, thence passing through a hemmed fold, or other holding fastening of the receptacle, to that end of the cross bar opposite to which it originated and is there securely fastened as at its beginning. The cord or draw string may be adjusted in manner similar to that described, but without securing the ends thereof to either cross bar as described, by continuing said ends and securely joining them together on the outer side of the cross bar; and thus attaining the same function and purpose as in the method first described. Prevention of chafing the cord or draw string, when passing through the holes K, K', is secured either by rounding the edges of said holes or inserting gromets therein. The cord or draw string is made of such length that, when the device is assembled as a unit, it shall be drawn taut throughout its entire length, and so afford proper support for the feed bag or receptacle on each of its sides which are at an angle to the cross bars B, B'; when not so assembled the cord will be loosened and so afford suitable handles for conveniently carrying the receptacle and the cross bars B, B'.

Hemmed folds, or other suitable holding fastenings, are provided upon the sides of the receptacle which are parallel to the cross bars when the device is assembled; these are adapted for the insertion of the cross bars, and the receptacle may be either partly or wholly supported through them if desired.

The feed bag or receptacle, made of canvas or other suitable material, is made of proper form and depth for containing feed, when the device is assembled as a unit. When not so assembled, the feed bag or receptacle may be readily converted into a form resembling a carrying bag, with proper closure and security, by pulling on the cord on either or both of its sides alongside the cross bars B, B'.

Having thus described our invention and improvement, and with knowledge that receptacles, commonly known as "nose bags", are now in use for holding feed for harnessed draft animals, we desire to call attention to the fact that an ordinary "nose bag", or other receptacle of appropriate form, may be readily attached to the supports herein described as part of our invention, without in any manner detracting from the advantages gained by the use of said supports.

Attention is called to the portability of the receptacle described, and the form it assumes when detached from the arms A, A', and the cord or draw string is tightened; a form closely resembling a hand bag or valise, with proper handles. The advantages of said form, in respect to holding capacity and readiness of transportation are obvious—and the fact that it can be readily cleansed, repaired or renewed strongly appeals in its favor. For these reasons we prefer a bag or receptacle as shown and described, but do not restrict our claim to this, or any other specific form of receptacle, when used in combination with the supports herein shown and described.

We especially call attention to the fact that many diseases of mouth, nostrils, throat and lungs of draft animals are due and attributable to the unsanitary conditions of the feed bag now in general use. We believe and claim that by affording the animal unrestricted opportunity for breathing and motion, when feeding from the device herein described and specified, such diseases will, in great measure if not entirely, be prevented.

We therefore claim:

1. A device for feeding harnessed draft animals, comprising a feed receptacle, forward projecting primary arms upon which said receptacle is supported, upward extending secondary arms, pivots connecting the lower portions of the secondary arms with the rear portions of the primary arms, said pivots being formed as lower harness engaging supports, and upper harness engaging supports carried by said secondary arms.

2. A device for feeding harnessed draft animals, comprising upward extending arms, a receptacle supported from and in advance of the lower portion of said arms, clamps slidable on said arms, and harness-engaging hook-bolts adapted to tighten said clamps on said arms.

3. A device for feeding harnessed draft animals, comprising laterally spaced forward projecting primary arms, upward extending secondary arms to the lower ends of which the rear ends of said primary arms are pivotally secured, harness-engaging supports carried by the arms, and a feed receptacle removably supported by said primary arms and maintaining the same spaced, said receptacle comprising a pair of transverse bars separably connecting and spacing said primary arms, and a bag supported by said bars.

4. A device for feeding harnessed draft animals, comprising laterally spaced forward projecting primary arms, upward extending secondary arms to the lower ends of which the rear ends of said primary arms are pivotally secured, harness-engaging supports carried by the arms, and a feed receptacle removably supported by said primary arms and maintaining the same spaced, said receptacle comprising a pair of transverse bars and a bag supported by said bars, said bars being notched on their under sides and said primary arms being notched on their upper sides for mutual engagement.

5. A device for feeding harnessed draft animals, comprising laterally spaced forward projecting arms, connections adapted to support the same in substantially horizontal position from the harness of the animal, a pair of transverse bars removably mounted on said arms and maintaining the same spaced, a bag supported on said bars, and a draw string adapted to draw said bars together to close the mouth of the bag when bag and bars are removed from said arms.

6. A device for feeding harnessed draft animals, comprising laterally spaced forward projecting arms, connections adapted to support the same in substantially horizontal position from the harness of the animal, a pair of transverse bars removably mounted on said arms and maintaining the same spaced, cords extending between said bars adjacent to said arms, and a bag two opposite margins of which are supported by said bars and the other two opposite margins by said cords.

WILLIAM HENRY GRANBERY.
JULIAN HASTINGS GRANBERY.

Witnesses:
L. R. Shattuck,
W. R. Simpson.